Sept. 9, 1958

A. E. DROBISH ET AL 2,851,656

TESTING APPARATUS

Filed Dec. 29, 1955

INVENTORS
A. E. DROBISH
L. M. HIBBEN
BY
C. B. Hamilton
ATTORNEY

United States Patent Office 2,851,656
Patented Sept. 9, 1958

2,851,656

TESTING APPARATUS

Adolph E. Drobish, Riverside, and Lawrence M. Hibben, Berwyn, Ill., assignors to Western Electric Company, Incorporated, New York, N. Y., a corporation of New York Application December 29, 1955, Serial No. 556,344

5 Claims. (Cl. 324—34)

This invention relates to testing apparatus and more particularly to apparatus for testing magnetic cores.

An object of this invention is to provide an apparatus for rapidly testing the magnetic capabilities of relay cores.

One embodiment of the present invention may include a member for holding a core to be tested in a coil and spaced from a spring loaded armature. The coil is energized sufficiently to move the spring loaded armature into engagement wtih the core where it should be retained at a predetermined reduced magnetic force obtained by reducing the current through the coil. If the armature is not so retained the magnetic capability of the core is inadequate.

Other objects and advantages of the invention will become apparent by reference to the following detailed description thereof and the accompanying drawing illustrating one embodiment of the invention, in which.

Figure 1:
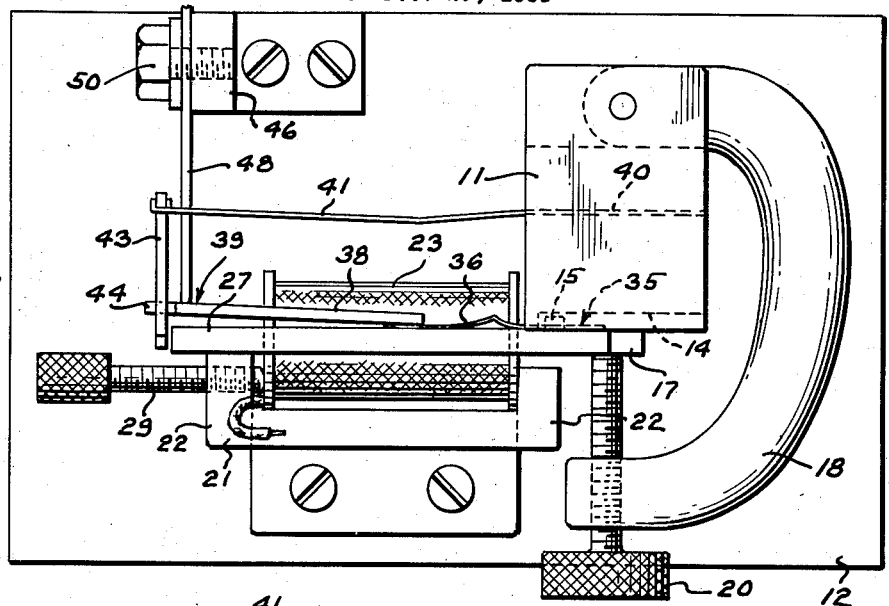
Fig. 1 is a plan view of the device with a core to be tested held therein and showing the armature in its unactuated position.

Referring now in detail to the drawing, a supporting block 11 is shown secured to a base 12 and having a pair of spaced nesting grooves 14 for receiving a pair of lugs 15 of a relay core 17 to be tested, the nesting of the lugs 15 in the grooves 14 insuring that the core 17 is held in the proper test position. A clamp 18 pivoted to the block 11 is provided with a knurled thumb screw 20 for firmly securing the core 17 to the block 11 in test position.

Figure 2:
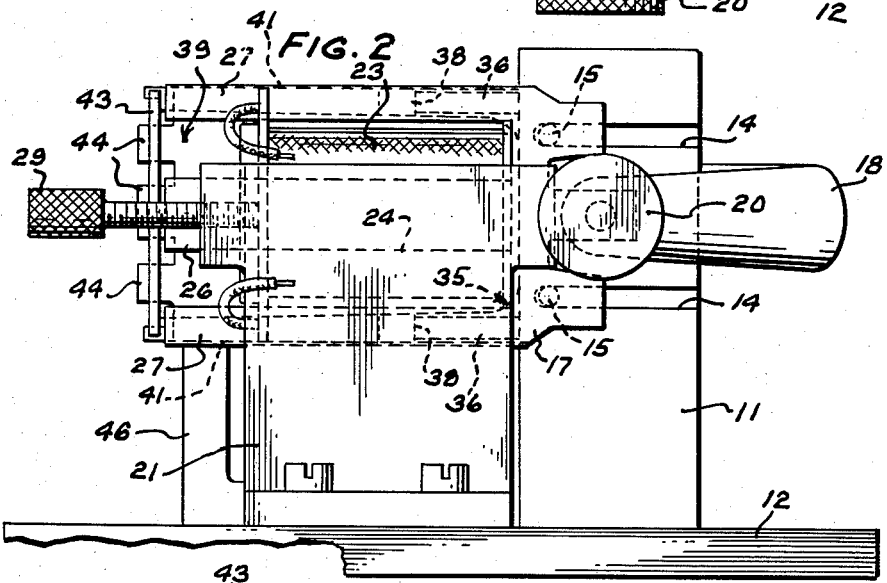
Fig. 2 is a front view of the device shown in Fig. 1.
Figure 3:
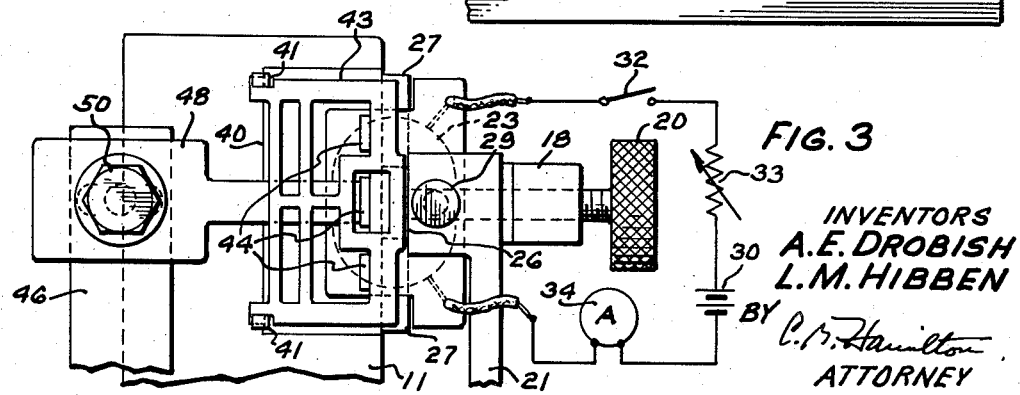
Fig. 3 is an end view of the device showing a schematic of the circuit used in the operation of the device.

A member 21 secured to the base 12 supports a coil 23 having a central aperture 24 (Fig. 2) in alignment with the block 11 whereby when the core 17 is positioned thereon a central projection 26 of the core 17 extends into the aperture 24 in the coil 23 and a pair of outer projections 27 of the core 17 are positioned on opposite sides of the coil 23 as illustrated in Figs. 2 and 3. The coil 23 is held between flanges 22 (Fig. 1) of the member 21 by a screw 29 threaded through one of the flanges 22. A battery 30 (Fig. 3) supplies the coil 23 with direct current when a switch 32 in the circuit is closed. A variable resistance 33 is connected between the battery 30 and the coil 23 for varying the current supplied thereto, and an ammeter 34 is connected in the circuit for measuring the current flowing therein.

A U-shaped spring 35 secured to the block 11 has portions 36 (Figs. 1 and 2) extending from the block 11 on opposite sides of the coil 23, which portions 36 are secured to extensions 38 of a U-shaped armature 39 whereby the spring 35 and the armature 39 form a closed loop around the coil 23. A stiff leaf spring 40 secured to the block 11 and spaced from the spring 35 has portions 41 which extend in positions generally parallel to the extending portions 36 of the spring 35. The ends of the stiff spring portions 41 are attached to an apertured card 43 which extends perpendicularly from the portions 41 toward the armature 39. Extended portions 44 of the armature 39 project through the apertured card 43 to couple the armature 39 to the stiff spring portions 41 whereby they urge the armature 39 away from the core 17 held in test position. An element 46 secured to the base 12 supports a stop 48 (Figs. 1 and 3) which engages the armature 39 to limit its movement away from the core 17 (Fig. 1). The stop 48 is secured to the element 46 by a screw 50 threaded into the element 46 whereby the position of the stop 48 is adjustable to vary the distance the two stiff spring portions 41 can move the armature 39 from the core 17.

If it is desirable, the two stiff spring portions 41 can be bent to reduce their tension whereby when the current applied to the coil 23 is of the predetermined test value the armature 39 will be moved into engagement with the core if its magnetic properties are adequate. When the device is used in this manner the current in the coil 23 need not be increased past the predetermined test value to move the armature 39 into engagement with the core 17, and then decreased to the test value to determine whether the armature 39 will be retained in engagement with the core 17. Instead, only a current of test value is applied to the coil 23. If the magnetic properties of the core 17 are adequate the armature 39 will be moved into engagement with the core 17.

In operation of the device, the core 17 is positioned on the block 11 as illustrated in the drawing, the lugs 15 on the core 17 entering the grooves 14 in the block 11 to insure that the core is properly positioned. The clamp 18 is swung into position (Fig. 1) and the thumb screw 20 is turned to firmly secure the core 17 to the block 11.

The switch 32 is then closed to connect the battery 30 to the coil 23 and the resistance 33 is decreased to increase the current in the coil 23 until the magnetic field produced moves the armature 39 from engagement with the stop 48 into engagement with the outer projections 27 of the core 17. The armature 39 should be retained in this position by a magnetic field of reduced force, if the core 17 has sufficient magnetic capability. The resistance 33 is then increased to decrease the current in the coil 23 to a predetermined test value to thus reduce the strength of the magnetic field. If the armature 39 remains in engagement with the core 17 under the influence of this reduced magnetic field the magnetic properties of the core 17 are adequate.

The thumb screw 20 is then loosened and the core 17 is removed from the device. Another core 17 to be tested is then inserted into the device and the above procedure is repeated.

The device can be used in another manner by adjusting the tension of the stiff spring portions 41 to an amount whereby when the predetermined test current is applied to the coil 23 the armature 39 will be moved into engagement with the test core 17. After the tensions of the two spring portions 41 are adjusted (by bending them) to such an amount the core 17 is secured in the device as described above. Current of the predetermined test value is then applied to the coil 23. The armature 39 will be then moved into engagement with the core 17 if its magnetic properties are adequate.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for testing magnetic cores, support means, releasable clamping means pivoted to the support means for holding a core, a movable armature attached to the support means and spaced from the core held by the clamping means, means for establishing a magnetic field around the core for moving the armature into engagement with the core, and resilient means carried by the support means for urging the armature out of engagement with the core if the magnetic properties of the core are inadequate.

2. A device for testing magnetic cores, comprising a base, releasable clamping means on the base for holding a core to be tested, an armature carried by the base and spaced from the core, resilient means carried by the base for urging the armature away from the core, a coil mounted on the core, means for supplying current to the coil for establishing a magnetic field around the core whereby the armature is moved into engagement with said core, and means for reducing said current to reduce the strength of the magnetic field to a predetermined value after the armature is in engagement with the core to determine the magnetic capability of the core.

3. A device for testing cores, comprising a base, a releasable clamp on the base for holding a core to be tested, an armature carried by the base and positioned adjacent to the core, resilient means carried by the base for retaining the armature in spaced relationship with the core, a coil mounted on the core, adjustable means for supplying current to the coil to establish a magnetic field around the core to pull the armature to the core, and means for adjusting the distance the armature is spaced from the core.

4. A device for testing cores, comprising a base, a support member secured to the base, a releasable clamp on the support member for supporting a core to be tested, a coil mounted on the base and having a central aperture in which a portion of the core is positioned, a movable armature attached to the support member, means for supplying current to the coil to establish a magnetic field therearound whereby the armature is moved toward the core, means for reducing said current to reduce the strength of said magnetic field, a spring secured to the support member and connected to the armature for moving the armature away from the core if the magnetic properties of the core are inadequate, and a stop mounted on the base for limiting the distance the spring can move the armature.

5. A device for testing cores, comprising a base, a block mounted on the base, a releasable clamping member pivoted to the block for supporting a core to be tested, an apertured coil supported on the base and positioned whereby a portion of the core clamped on the block will extend into the aperture in the coil, a movable armature mounted on the block, a spring mounted on the block and connected to the armature for holding the armature in spaced relationship with the core, an adjustable stop mounted on the base for engaging the armature to vary the distance the armature is spaced from the core, means for supplying current to the coil to energize it whereby a magnetic field is established around the core and the armature is moved into engagement with the core, and means for reducing the current supplied to the coil to reduce the strength of the magnetic field after the armature has moved into engagement with the core to ascertain if the spring will pull the armature away from the core thus indicating the magnetic capability of the core.

References Cited in the file of this patent

UNITED STATES PATENTS

| | | |
|---|---|---|
| 1,560,727 | Pruden | Nov. 10, 1925 |
| 1,883,773 | Erickson | Oct. 18, 1932 |